US012795698B2

(12) United States Patent
Ahn et al.

(10) Patent No.: US 12,795,698 B2
(45) Date of Patent: Nov. 10, 2026

(54) METHOD AND APPARATUS FOR TIME-DIVISION TRANSMISSION OF HETEROGENEOUS PHYSICAL-LAYER SIGNALS

(71) Applicant: ELECTRONICS AND TELECOMMUNICATIONS RESEARCH INSTITUTE, Daejeon (KR)

(72) Inventors: Seok-Ki Ahn, Daejeon (KR); Sung-Ik Park, Daejeon (KR); Sun-Hyoung Kwon, Daejeon (KR); Sung-Jun Ahn, Daejeon (KR); Jung-Sun Um, Daejeon (KR); Hoi-Yoon Jung, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 743 days.

(21) Appl. No.: 18/297,523

(22) Filed: Apr. 7, 2023

(65) Prior Publication Data

US 2024/0032071 A1 Jan. 25, 2024

(30) Foreign Application Priority Data

Jul. 25, 2022 (KR) ........................ 10-2022-0091751

(51) Int. Cl.

*H04W 72/30* (2023.01)
*H04W 72/12* (2023.01)
*H04L 12/18* (2006.01)

(52) U.S. Cl.

CPC ........... *H04W 72/30* (2023.01); *H04W 72/12* (2013.01); *H04L 12/189* (2013.01)

(58) Field of Classification Search

None

See application file for complete search history.

(56) References Cited

U.S. PATENT DOCUMENTS

| | | | | |
|---|---|---|---|---|
| 8,213,348 | B2 | 7/2012 | Ai | |
| 10,405,149 | B2 | 9/2019 | Kim et al. | |
| 11,088,794 | B2 * | 8/2021 | Wang ........................ | H04B 3/32 |

(Continued)

FOREIGN PATENT DOCUMENTS

| | | |
|---|---|---|
| KR | 10-1125660 | 3/2012 |
| KR | 10-2015-0124687 | 11/2015 |

(Continued)

OTHER PUBLICATIONS

Sungjun Ahn et al., "Converged Distribution of 5G Media: Opportunities of Overlaid Broadcast and Emerging 1 Applications Over Dual Connectivity," IEEE Transactions on Broadcasting, Jun. 1, 2022, 501-16, vol. 68, Issue 2, https://doi.org/10.1109/TBC.2021.3136755.

*Primary Examiner* — Anh Ngoc M Nguyen

(74) *Attorney, Agent, or Firm* — KILE PARK REED & HOUTTEMAN PLLC

(57) ABSTRACT

Disclosed herein is a method for time-division transmission of heterogeneous physical-layer signals. The method may include setting time-division-related information and alternately transmitting heterogeneous physical-layer signals to a terminal over the same frequency resource based on the time-division-related information.

18 Claims, 10 Drawing Sheets

(56) References Cited

U.S. PATENT DOCUMENTS

| | | | | |
|---|---|---|---|---|
| 2012/0243458 | A1* | 9/2012 | Ai | H04W 72/30 370/312 |
| 2015/0358966 | A1* | 12/2015 | Zheng | H04W 74/006 370/329 |
| 2019/0116592 | A1 | 4/2019 | Moon et al. | |
| 2019/0174200 | A1* | 6/2019 | Choi | H04N 21/2385 |
| 2019/0222374 | A1* | 7/2019 | Chen | H04L 5/0007 |
| 2021/0067266 | A1 | 3/2021 | Ahn et al. | |
| 2022/0201709 | A1 | 6/2022 | Sun et al. | |

FOREIGN PATENT DOCUMENTS

| | | |
|---|---|---|
| KR | 10-2016-0144873 | 12/2016 |
| KR | 10-2022-0104010 | 7/2022 |

* cited by examiner

| Index | Bit Value | Mininmum Time Interval(ms) |
|---|---|---|
| 0 | 00000 | 50 |
| 1 | 00001 | 100 |
| 2 | 00010 | 150 |
| 3 | 00011 | 200 |
| 4 | 00100 | 250 |
| 5 | 00101 | 300 |
| 6 | 00110 | 350 |
| 7 | 00111 | 400 |
| 8 | 01000 | 500 |
| 9 | 01001 | 600 |
| 10 | 01010 | 700 |
| 11 | 01011 | 800 |
| 12 | 01100 | 900 |
| 13 | 01101 | 1000 |
| 14 | 01110 | 1100 |
| 15 | 01111 | 1200 |
| 16 | 10000 | 1300 |
| 17 | 10001 | 1500 |
| 18 | 10010 | 1700 |
| 19 | 10011 | 1900 |
| 20 | 10100 | 2100 |
| 21 | 10101 | 2300 |
| 22 | 10110 | 2500 |
| 23 | 10111 | 2700 |
| 24 | 11000 | 2900 |
| 25 | 11001 | 3300 |
| 26 | 11010 | 3700 |
| 27 | 11011 | 4100 |
| 28 | 11100 | 4500 |
| 29 | 11101 | 4900 |
| 30 | 11110 | 5300 |
| 31 | 11111 | Not Applicable |

FIG. 5

METHOD AND APPARATUS FOR TIME-DIVISION TRANSMISSION OF HETEROGENEOUS PHYSICAL-LAYER SIGNALS

CROSS REFERENCE TO RELATED APPLICATION

This application claims the benefit of Korean Patent Application No. 10-2022-0091751, filed Jul. 25, 2022, which is hereby incorporated by reference in its entirety into this application.

BACKGROUND OF THE INVENTION

1. Technical Field

The present disclosure relates to a method and apparatus for transmitting heterogeneous physical-layer signals of different transmission standards within a time-division period in a time-division manner.

2. Description of the Related Art

A cellular mobile communication network has been developed mainly for provision of a point-to-point (PTP) transmission service, but the development of broadband wireless transmission technology and terminals capable of providing various technical functions results in demand for various services.

Particularly, Multimedia Broadcast Multicast Services (MBMS) is technology capable of providing a mobile broadcast service using only cellular mobile communication, and a Long Term Evolution (LTE)-based communication service using enhanced-MBMS (eMBMS) is under discussion.

Unlike a PTP transmission service, MBMS is a point-to-multipoint (PTMP) transmission service, and has an advantage in that it increases efficiency of use of wireless resources in such a way that a base station transmits the same packet to multiple terminals within a single cell.

However, the convention PTMP transmission service is configured to transmit only homogeneous physical-layer signals in a time-division manner, and there is very little research on time-division transmission of heterogeneous physical-layer signals.

SUMMARY OF THE INVENTION

An object of the present disclosure is to provide a method and apparatus for time-division transmission of heterogeneous physical-layer signals in order to transmit the heterogeneous physical-layer signals within a time-division period in a time-division manner.

In order to accomplish the above object, a method for time-division transmission of heterogeneous physical-layer signals according to the present disclosure may include setting time-division-related information and alternately transmitting heterogeneous physical-layer signals to a terminal over the same frequency resource based on the time-division-related information.

The time-division-related information may include a time-division period and at least one communication signal transmission section value indicating a point at which communication signal transmission ends within the time-division period, and a section in which a communication signal, among the heterogeneous physical-layer signals, is transmitted may be set through the time-division period and the communication signal transmission section value.

When the time-division period is an MCH scheduling period (MSP), the ratio between the heterogeneous physical-layer signals to be transmitted may be changed by changing the communication signal transmission section value.

When the time-division period is a multiple of an MSP, the communication signal transmission section value may be set to a multiple of the MSP.

The communication signal transmission section value may be set through an MCH scheduling information (MSI) value.

The MSI value may be a value of a section in which transmission of the communication signal ends within the MSP.

When the time-division period is a common subframe allocation period (CSAP), the communication signal transmission section value may include at least one Sf-AllocEnd value.

For each physical multicast channel (PMCH) within the CSAP, the Sf-AllocEnd value may be a value of a section in which a current PMCH is transmitted based on the time at which transmission of a previous PMCH ends.

The method may further include notifying the terminal of the time-division-related information.

The heterogeneous physical-layer signals may include a communication signal and a broadcast signal.

Also, in order to accomplish the above object, an apparatus for time-division transmission of heterogeneous physical-layer signals according to the present disclosure may include memory in which a control program for time-division transmission of heterogeneous physical-layer signals is stored and a processor for executing the control program stored in the memory, and the processor may set time-division-related information and alternately transmit heterogeneous physical-layer signals to a terminal over the same frequency resource based on the time-division-related information.

The time-division-related information may include a time-division period and at least one communication signal transmission section value indicating a point at which communication signal transmission ends within the time-division period, and the processor may set a section in which a communication signal, among the heterogeneous physical-layer signals, is transmitted through the time-division period and the communication signal transmission section value.

When the time-division period is an MCH scheduling period (MSP), the processor changes the communication signal transmission section value, thereby changing the ratio between the heterogeneous physical-layer signals to be transmitted.

When the time-division period is a multiple of an MSP, the processor may set the communication signal transmission section value to a multiple of the MSP.

The communication signal transmission section value may be set through an MCH scheduling information (MSI) value.

The MSI value may be a value of a section in which transmission of the communication signal ends within an MCH scheduling period (MSP).

When the time-division period is a common subframe allocation period (CSAP), the communication signal transmission section value may include at least one Sf-AllocEnd value.

For each physical multicast channel (PMCH) within the CSAP, the Sf-AllocEnd value may be a value of a section in which a current PMCH is transmitted based on the time at which transmission of a previous PMCH ends.

The processor may notify the terminal of the time-division-related information.

The heterogeneous physical-layer signals may include a communication signal and a broadcast signal.

BRIEF DESCRIPTION OF THE DRAWINGS

The above and other objects, features, and advantages of the present disclosure will be more clearly understood from the following detailed description taken in conjunction with the accompanying drawings, in which:

FIG. 5 is a view illustrating information about the location of a bootstrap of ATSC 3.0 according to an embodiment of the present disclosure;

DESCRIPTION OF THE PREFERRED EMBODIMENTS

Figure 1:
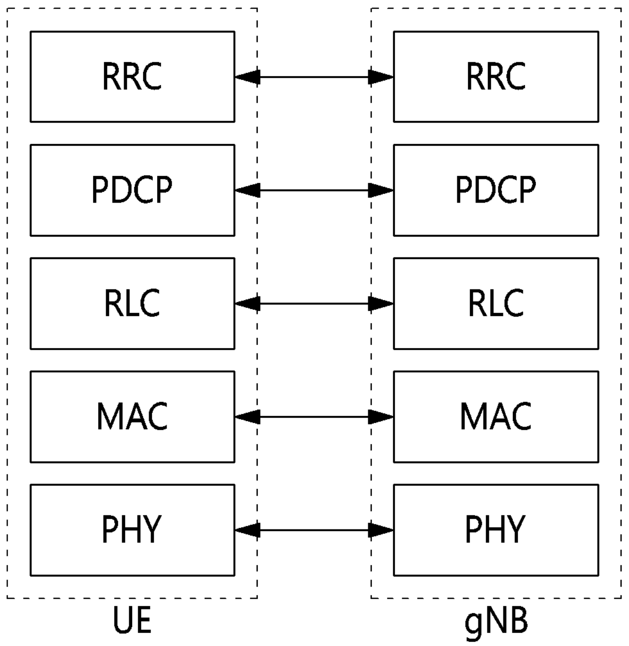
FIG. 1 is a view illustrating a control plane structure of a radio interface protocol between a Radio Access Network (RAN) and a terminal based on a 3GPP RAN standard according to an embodiment of the present disclosure.

The advantages and features of the present disclosure and methods of achieving the same will be apparent from the exemplary embodiments to be described below in detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

All of the downlink and uplink of a physical layer of a 3GPP communication standard may be configured with physical channels for transmitting information received from an upper layer through physical resources and physical signals corresponding to physical-layer signals in which the information received from the upper layer is not included.

In the case of the downlink, a physical downlink shared channel (PDSCH), a physical downlink control channel (PDCCH), a physical broadcast channel (PBCH), and a physical multicast channel (PMCH) are representative physical channels.

In the case of the uplink, a physical uplink shared channel (PUSCH), a physical uplink control channel (PUCCH), and a physical random access channel (PRACH) are representative physical channels.

Figure 2:
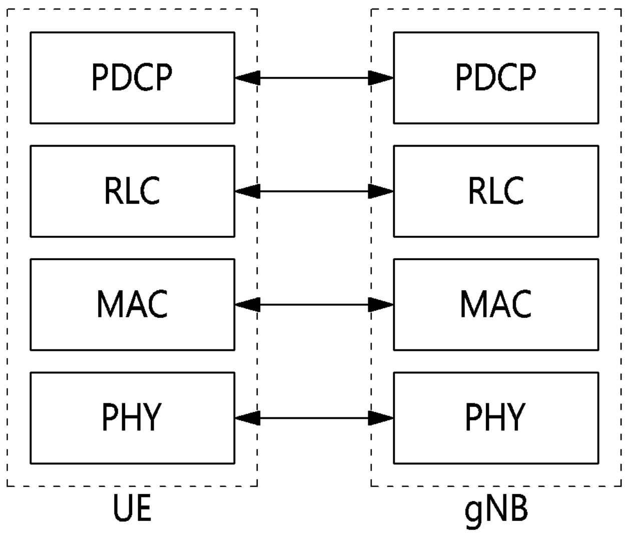
FIG. 2 is a view illustrating a user plane structure of a radio interface protocol between a RAN and a terminal based on a 3GPP RAN standard according to an embodiment of the present disclosure.

FIG. 1 is a view illustrating a control plane structure of a radio interface protocol between a RAN and a terminal based on a 3GPP RAN standard according to an embodiment of the present disclosure, and FIG. 2 is a view illustrating a user plane structure of a radio interface protocol between a RAN and a terminal based on the 3GPP RAN standard according to an embodiment of the present disclosure.

Referring to FIG. 1 and FIG. 2, the control plane structure and user plane structure of the radio interface protocol between a RAN and a terminal based on the 3GPP RAN standard may indicate channels through which a control message and a data message are transferred.

A physical layer (PHY), which is the first layer, and a medium access control (MAC) layer, which is the second layer, are connected through a transport channel. Accordingly, data may be transferred between the physical layer and the MAC layer.

A real physical channel is present between the physical layer of a base station and the physical layer of a terminal, and data is transferred therethrough. The physical channel may be represented using a time resource and a frequency resource.

The MAC layer, which is the second layer, may be connected with a radio link control (RLC) layer, which is an upper layer thereof, through a logical channel. A radio resource control (RRC) layer included in the third layer is defined only in the control plane, and may serve to control the physical channels, the transport channels, and the logical channels. To this end, the respective RRC layers of the RAN and the terminal exchange an RRC message, whereby an RRC connected state may be established.

Figure 3:
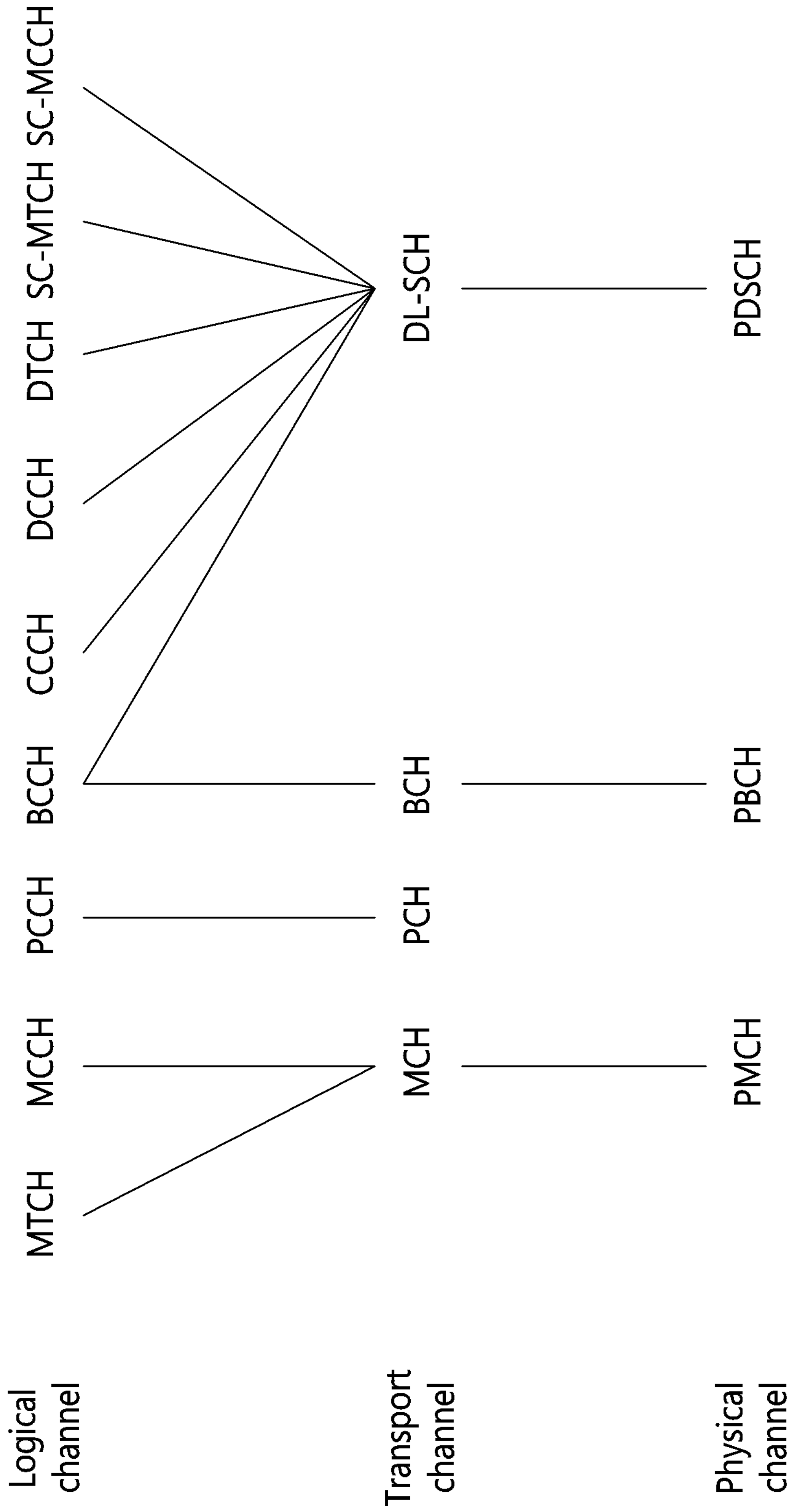
FIG. 3 is a view illustrating the mapping between a physical channel, a transport channel, and a logical channel of an LTE downlink according to an embodiment of the present disclosure.

FIG. 3 is a view illustrating the mapping between the physical channels, the transport channels, and the logical channels of an LTE downlink according to an embodiment of the present disclosure.

As illustrated in FIG. 3, a broadcast control channel (BCCH) is a logical channel representing system control information that a base station broadcasts to arbitrary terminals. The BCCH may include a master information block (MIB) transmitted through a PBCH and system information blocks (SIBs) transmitted through a PDSCH.

Pieces of control information for point-to-multipoint transmission may be transmitted using SIBs or may be transmitted through a multicast control channel (MCCH) or a single-cell multicast control channel (SC-MCCH), which are separate dedicated channels. The MCCH and the SC-MCCH may be used to transmit control information respectively for a multicast-broadcast single-frequency network (MBSFN) and single-cell point-to-multipoint (SC-PTM) transmission. For example, in the case of LTE SC-PTM transmission, control information related to the configuration of the SC-MCCH may be transmitted using an SIB 1 or an SIB 13, and control information related to the configuration of a single-cell multicast traffic channel (SC-MTCH) may be transmitted through the SC-MCCH.

Figure 4:
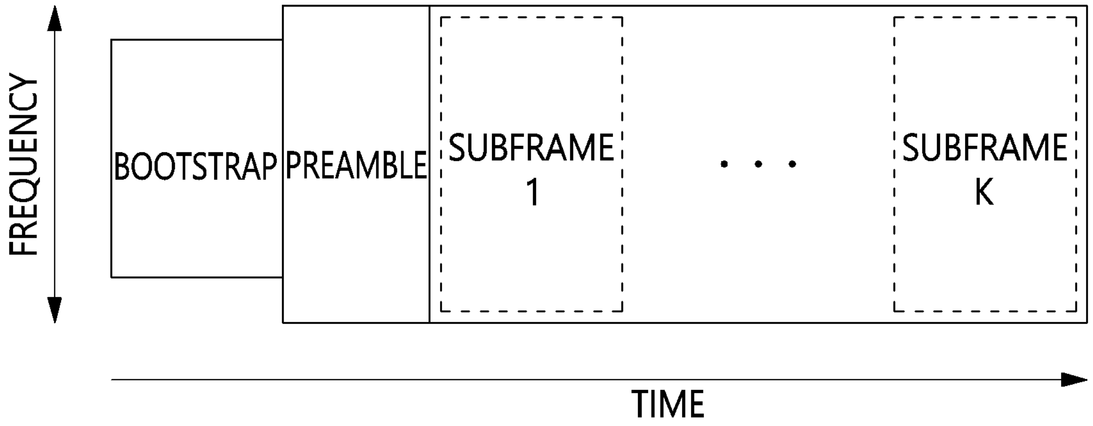
FIG. 4 is a view for explaining the structure of an ATSC 3.0 frame according to an embodiment of the present disclosure.

FIG. 4 is a view for explaining the structure of an ATSC 3.0 frame according to an embodiment of the present disclosure.

As illustrated in FIG. 4, a physical layer of the ATSC 3.0 broadcast standard is configured in units of frames, and an ATSC 3.0 frame may include a bootstrap, a preamble, and one or more subframes.

These elements of the physical layer are configured with one or more OFDM symbols, and a frame may include a reference symbol or a pilot symbol.

The bootstrap of ATSC 3.0 generally has fixed bandwidth, and the preamble and the subframe may have bandwidth that is variable and wider than that of the bootstrap. The preamble may have a length that varies depending on signaling information, and the bootstrap may include a symbol indicating the structure of the preamble. That is, in order to indicate the structure of the preamble supported by ATSC 3.0, a 7-bit fixed symbol may be allocated to the bootstrap.

When these elements of the physical layer are received, the bootstrap may be first detected and demodulated, and the preamble is decoded using the demodulated information, whereby signaling information may be restored. Subsequently, data information included in the subframe may be restored based on the signaling information.

FIG. 5 is a view illustrating information about the location of a bootstrap of ATSC 3.0 according to an embodiment of the present disclosure.

As illustrated in FIG. 5, a bootstrap of ATSC 3.0 may include information about the location of the next bootstrap of the same version, and may indicate the minimum time interval between the current bootstrap and the next bootstrap to a terminal. Accordingly, ATSC 3.0 terminals may approximately estimate the location of the next bootstrap.

Figure 6:
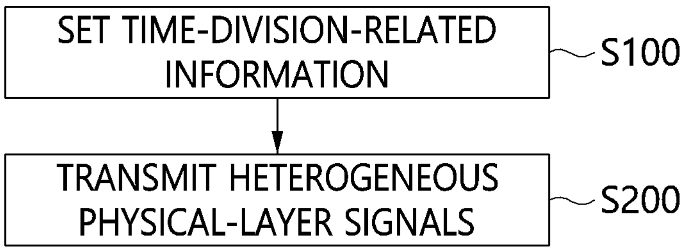
FIG. 6 is a flowchart illustrating a method for time-division transmission of heterogeneous physical-layer signals according to an embodiment of the present disclosure.

FIG. 6 is a flowchart illustrating a method for time-division transmission of heterogeneous physical-layer signals according to an embodiment of the present disclosure.

The method for time-division transmission of heterogeneous physical-layer signals may be performed by a time-division transmission apparatus. Time-division transmission is configured to transmit heterogeneous physical-layer signals over the same frequency resource, and the heterogeneous physical-layer signals may include a communication signal based on the 3GPP standard and a broadcast signal based on the ATSC 3.0 standard. Alternatively, the heterogeneous physical-layer signals may include a 3GPP signal and a non-3GPP signal. Alternatively, the heterogeneous physical-layer signals may include an ATSC 3.0 signal and a non-ATSC 3.0 signal.

The time-division transmission apparatus may set time-division-related information at step S100. The time-division-related information may include a time-division period and a 3GPP signal transmission section for a communication signal.

The time-division period may indicate, when heterogeneous physical-layer signals are transmitted over the same frequency resource in a time-division manner, a total amount of time required to alternately transmit the two physical signals. In this case, the transmission end may set the length of the time-division period so as not to violate reception continuity of each receiver.

The time-division transmission apparatus may transmit heterogeneous physical-layer signals to a terminal based on the set time-division-related information at step S200.

The heterogeneous physical-layer signals may be transmitted from transmitters at the same physical location, or may be transmitted from two or more transmitters that are placed at different physical locations. When the transmitters are placed at different physical locations, a separate component for controlling the two or more transmitters may be present.

When time-division transmission is performed, the heterogeneous physical-layer signals are controlled not to be transmitted at the same time over the same frequency resource from the aspect of transmission, whereby interference between the signals may be minimized. From the aspect of reception, the terminal is notified of information about a time period during which a target signal is not transmitted, whereby unnecessary power consumption, which can be caused when the terminal receives unnecessary signals, may be prevented and reception continuity may be maintained.

To this end, the time-division transmission apparatus may notify the terminal of the time-division-related information. Here, the terminal receiving the signal may be a terminal capable of receiving only 3GPP signals, a terminal capable of receiving only ATSC 3.0 signals, or a terminal capable of receiving both 3GPP signals and ATSC 3.0 signals.

Figure 7:
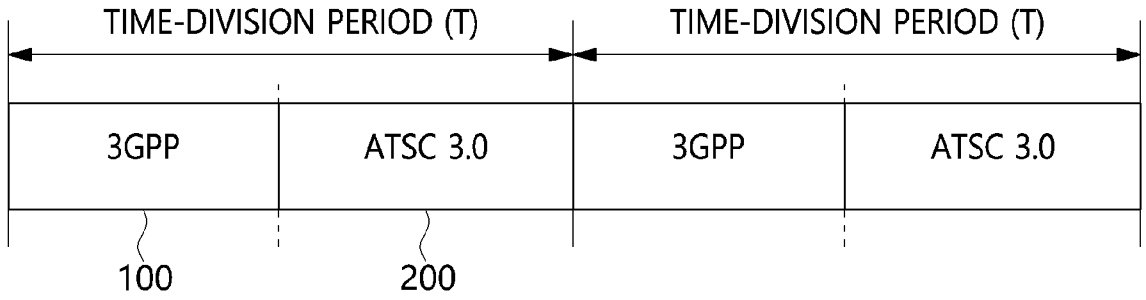
FIG. 7 is a view illustrating an example in which a 3GPP signal and an ATSC 3.0 signal are alternately transmitted within a time-division period.

FIG. 7 is a view illustrating an example in which a 3GPP signal and an ATSC 3.0 signal are alternately transmitted within a time-division period.

As illustrated in FIG. 7, the time-division transmission apparatus may alternately transmit a 3GPP signal 100 and an ATSC 3.0 signal 200 within a time-division period T. Here, as a method for notifying a 3GPP terminal, which receives only the 3GPP signal 100, of the section in which no 3GPP signal is transmitted, it may be indicated to the terminal that the logical channel to be received by the terminal is not allocated or that the physical channel to be received by the terminal is not allocated. For example, in the case of a 3GPP MBMS service, the above-mentioned logical channel and physical channel may respectively indicate an MTCH and a PMCH.

In order to transmit time-division information to the 3GPP terminal, a time-division period and information about the section in which a 3GPP signal is transmitted within the time-division period may be transferred to the 3GPP terminal. As a method for time-division transmission, a multiple of an MCH scheduling period (MSP) used in a 3GPP MBMS service may be used as the time-division period, or a common subframe allocation period (CSAP) may be used as the time-division period.

When a multiple of the MSP is used as the time-division period T, whether or not a 3GPP signal is transmitted may be indicated to the terminal using information about allocation/non-allocation of an MTCH, which is a logical channel received by the terminal.

When a CSAP is used as the time-division period T, whether or not a 3GPP signal is transmitted may be indicated to the terminal using information about allocation/non-allocation of a PMCH, which is a physical channel received by the terminal.

Figure 8:
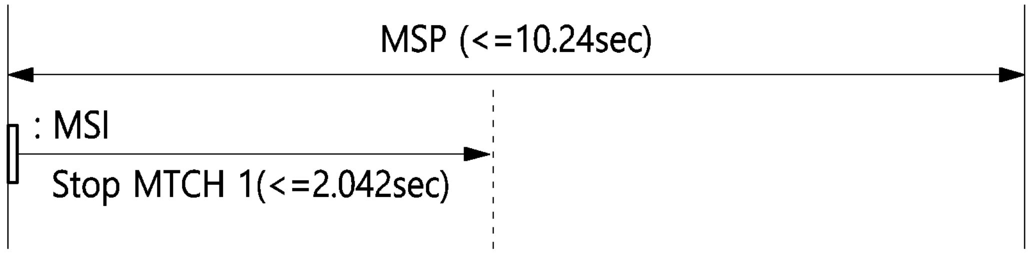
FIG. 8 is a view illustrating a method for indicating time-division information to a terminal using an MCH Scheduling Period (MSP) and MCH Scheduling Information (MSI)

FIG. 8 is a view illustrating a method for indicating time-division information to a terminal using an MSP and MSI.

The MSP used as a time-division period may be indicated to a terminal using mch-SchedulingPeriod, which is an RRC message, through an MCCH corresponding to a logical channel, and one of 10 ms, 20 ms, 40 ms, . . . , 10240 ms, which are MSP values allowed in the 3GPP standard, may be defined as the time-division period and indicated to the terminal.

The section in which a 3GPP signal is transmitted within the time-division period may be indicated to the terminal through a 11-bit stop MTCH value transmitted through a MAC CE of a PMCH, to which an MCCH is mapped, at the start point of the MSP, and this information may be referred to as MCH scheduling information (MSI).

The transmission end may notify the terminal of the time-division period and the 3GPP signal transmission section through the MSP and the Stop MTCH value, respectively.

Figure 9:
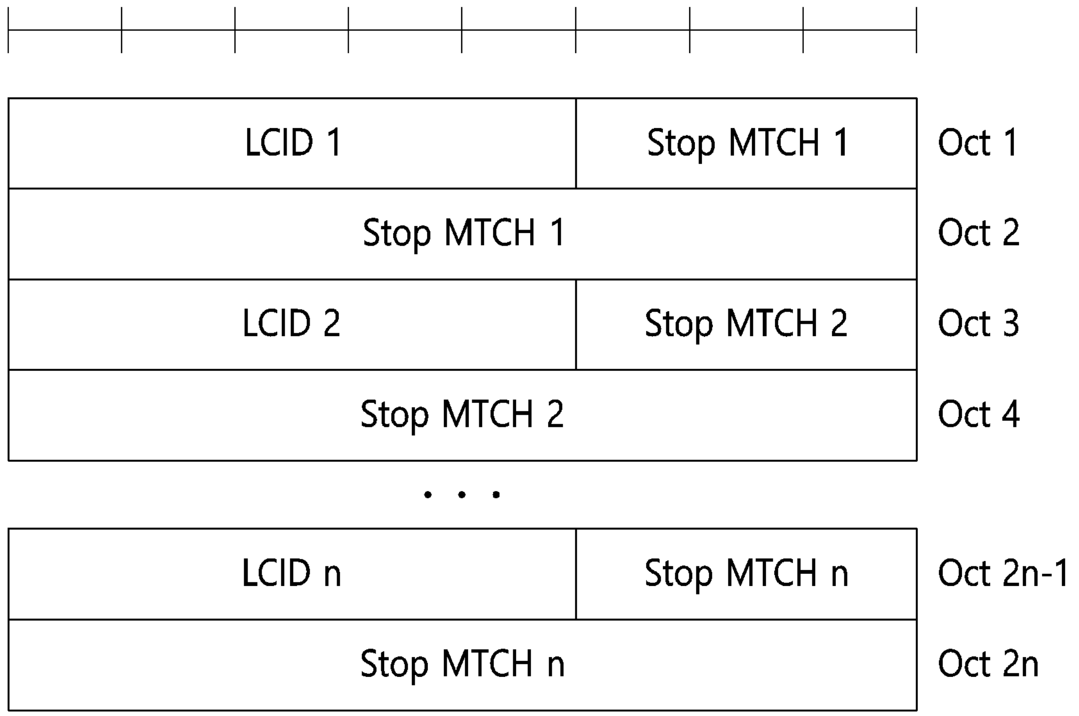
FIG. 9 is a view illustrating the configuration of MSI.

FIG. 9 is a view illustrating the configuration of MSI.

As illustrated in FIG. 9, Stop MTCH may be defined for each Logical Channel Identification (LCID) value that is mapped for each MTCH, which is a logical channel. Stop MTCH 1 may indicate the point at which transmission of MTCH 1 corresponding to LCID 1 ends within the MSP. As the value of Stop MTCH, 1 ms, 2 ms, 3 ms, . . . , 2042 ms defined in the 3GPP standard are used, and these values may be indicated to the terminal as a 3GPP signal section.

For example, when one or more MTCHs are used within the section in which a 3GPP signal is transmitted, the section in which the 3GPP signal is transmitted may be indicated using a Stop MTCH value corresponding to the last MTCH allocated to 3GPP terminals, among one or more Stop MTCH values included in the MSI.

Figure 10:
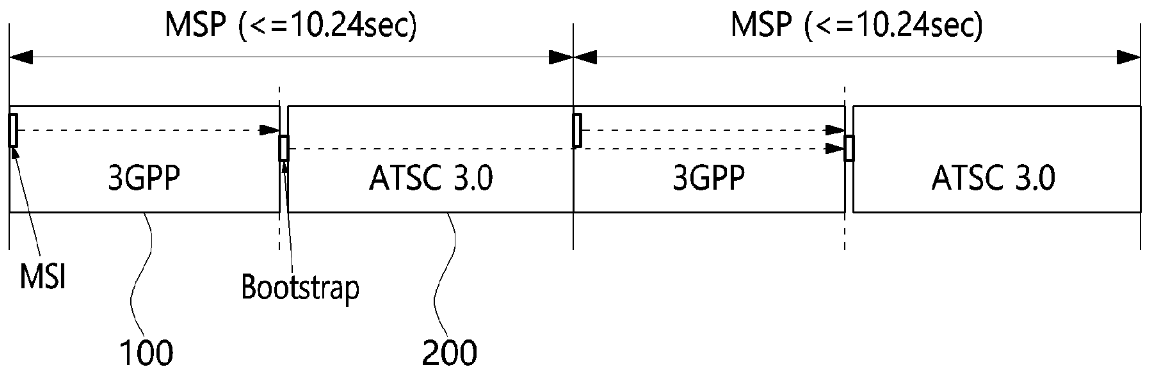
FIG. 10 is a view illustrating a process in which a 3GPP signal and an ATSC 3.0 signal are alternately transmitted within a time-division period when an MSP is set as the time-division period.

FIG. 10 is a view illustrating a process in which a 3GPP signal and an ATSC 3.0 signal are alternately transmitted within a time-division period when an MSP is set as the time-division period.

As illustrated in FIG. 10, a 3GPP terminal is made aware of the section in which a 3GPP signal 100 is transmitted through an MSP and MSI.

An ATSC 3.0 terminal is made aware of the start point of an ATSC 3.0 signal 200 within the current time-division period and the start point of an ATSC 3.0 signal 200 within the subsequent time-division period through a bootstrap. The ATSC 3.0 terminal decodes the preamble transmitted after the bootstrap, thereby being made aware of the section in which the ATSC 3.0 signal 200 is transmitted within the time-division period.

When time-division transmission is performed, a bootstrap may also be transmitted before a non-ATSC 3.0 signal, and an arbitrary signal section may always start with a bootstrap.

The bootstrap that is first transmitted in the ATSC 3.0 signal 200 and the bootstrap that is first transmitted in the non-ATSC 3.0 signal may have the same version.

Figure 11:
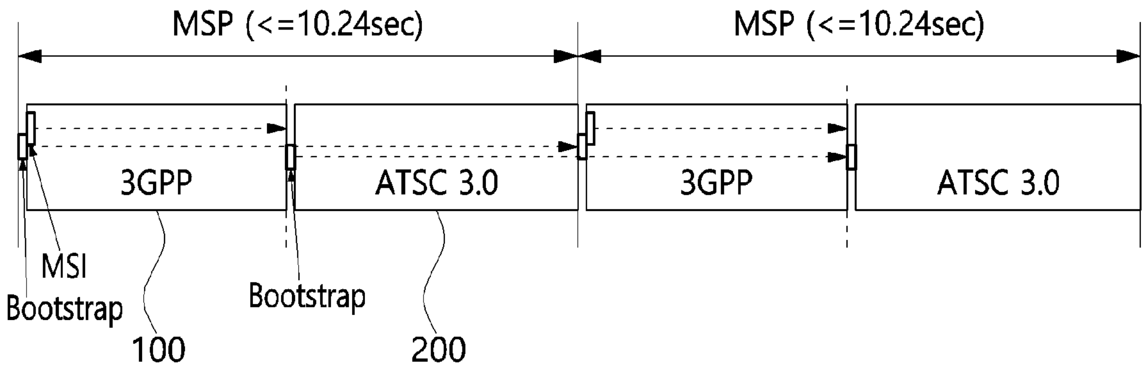
FIG. 11 is a view illustrating an example in which a bootstrap transmitted before a 3GPP signal and a bootstrap transmitted before an ATSC 3.0 signal have different versions.

FIG. 11 is a view illustrating an example in which a bootstrap transmitted before a 3GPP signal and a bootstrap transmitted before an ATSC 3.0 signal have different versions.

As illustrated in FIG. 11, a bootstrap transmitted first in an ATSC 3.0 signal 200 and a bootstrap transmitted first in a non-ATSC 3.0 signal may have different versions. When the bootstrap transmitted before the 3GPP signal 100 and the bootstrap transmitted before the ATSC 3.0 signal 200 have different versions, each of the bootstraps may indicate the time at which the next bootstrap having the same version as the corresponding bootstrap is to be transmitted.

Meanwhile, when time-division transmission in which an MSP is set as a time-division period is performed, the ratio between heterogeneous physical-layer signals to be transmitted may be changed by changing a Stop MTCH value. For example, when an MSP is 640 ms and when the ratio between a 3GPP signal and a non-3GPP signal is 1:1, Stop MTCH is set to 00101000000, whereby the 3GPP terminal may be notified that the transmission section of the 3GPP signal is 320 ms.

When the ratio between a 3GPP signal and a non-3GPP signal is changed to 3:1 while maintaining the MSP, Stop MTCH is set to 00111100000, whereby the terminal may be notified that the transmission section of the 3GPP signal is 480 ms.

In order to change the ratio between the 3GPP signal and non-3GPP signal while maintaining the time-division period, as described above, the MSI, which is transmitted at the start point of the MSP, may be changed and indicated to the terminal, and the changed time-division ratio may be indicated to the terminal for each preset MSP.

However, in order to change the time-division period, the change of the MSP has to be indicated to the terminal by changing a mch-SchedulingPeriod message, which is transferred to the terminal through an MCCH, so a procedure of changing the MCCH is required. Here, because 5120 ms and 10240 ms can be set as the MCCH change period in the 3GPP standard, the time-division period may be changed only at the corresponding time.

Figure 12:
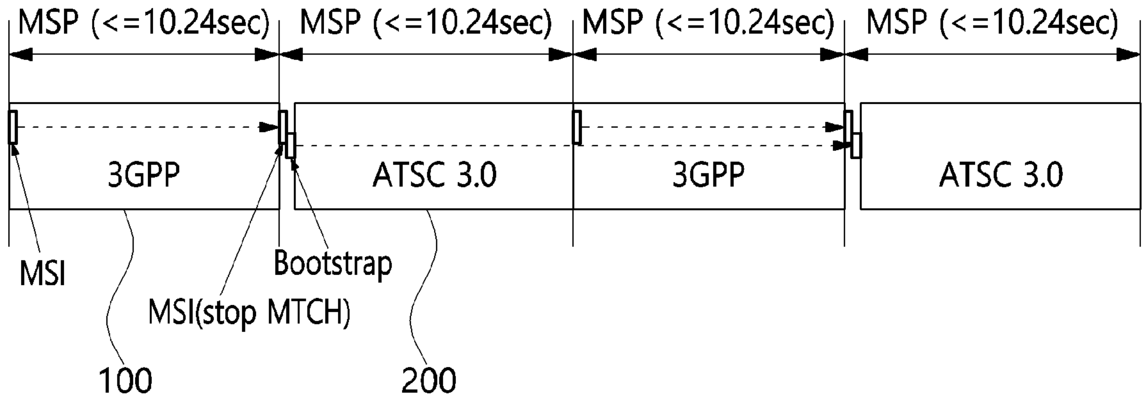
FIG. 12 is a view illustrating a process in which a 3GPP signal and an ATSC 3.0 signal are alternately transmitted within a time-division period when a multiple of an MSP is set as the time-division period.
Figure 13:
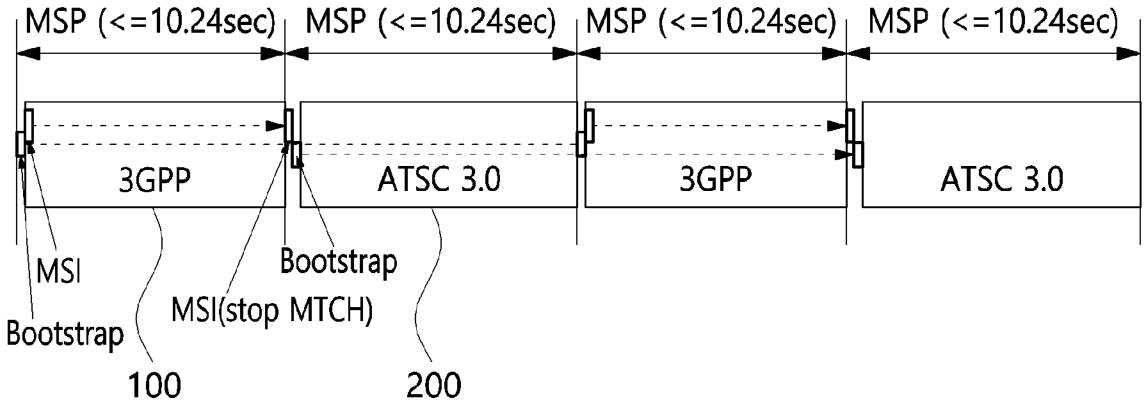
FIG. 13 is a view for explaining a method for transmitting a bootstrap before a non-ATSC 3.0 signal in FIG. 12.

FIG. 12 is a view illustrating a process in which a 3GPP signal and an ATSC 3.0 signal are alternately transmitted within a time-division period when a multiple of an MSP is set as the time-division period, and FIG. 13 is a view for explaining a method for transmitting a bootstrap before a non-ATSC 3.0 signal in FIG. 12.

As illustrated in FIG. 12, an MSP is indicated to a terminal using a form of mch-SchedulingPeriod, which is an RRC message, through an MCCH, which is a logical channel, and a multiple of one of the values of 10 ms, 20 ms, 40 ms, . . . , 10240 ms defined in the 3GPP standard may be used as the time-division period. Accordingly, in the MSP during which a 3GPP signal 100 is transmitted, the time indicated by Stop MTCH may have the same value as the MSP.

In the MSP during which the 3GPP signal 100 is not transmitted, Stop MTCH may have a value of 11111111111. This value may indicate that the corresponding MTCH is not transmitted in the current MSP.

When one or more MTCHs are used in the section in which the 3GPP signal 100 is transmitted, the time indicated by Stop MTCH corresponding to the last MTCH has the same value as the MSP in the MSP in which the 3GPP signal 100 is transmitted, and all of the Stop MTCH values in the MSP in which the 3GPP signal 100 is not transmitted may be set to 11111111111. Also, when an ATSC 3.0 signal 200 is transmitted as a non-3GPP signal, 11111111111 is set as the Stop MTCH value through MSI before the bootstrap of the ATSC 3.0 signal 200, whereby a 3GPP terminal may be notified that a 3GPP signal 100 is not transmitted in the corresponding section. Here, because an ATSC 3.0 signal 200 cannot be transmitted in the subframe section in which the MSI is transmitted in the MSP, a small amount of resource loss may be caused.

Whether or not a 3GPP signal 100 is present in each MSP may be indicated to a terminal through MSI, whereby the ratio (x:y) between a 3GPP signal and a non-3GPP signal to be transmitted may be indicated. For example, a time-division period is set to (x+y) times an MSP, and it may be indicated that a 3GPP signal 100 is transmitted during the x MSPs.

When a time-division period is a multiple of an MSP, the value indicating the section in which the communication signal is transmitted may be set to a multiple of the MSP.

As illustrated in FIG. 13, a bootstrap may also be transmitted before a 3GPP signal 100, which is a non-ATSC 3.0 signal.

Meanwhile, when a multiple of an MSP is used as a time-division period, a setting is made such that a 3GPP signal is not transmitted during x consecutive MSPs when Stop MTCH is set to one of reserved values of MSI, which are 2043 (11111111011) to 2046 (1111111 1100), rather than indicating non-transmission of a 3GPP signal using MSI for each MSP, whereby the MSI is transmitted only in the first MSP, among the consecutive MSPs in which a non-3GPP signal is transmitted, and there is no need to transmit the MSI in the remaining MSPs. Accordingly, when a non-3GPP signal is transmitted during consecutive MSPs, resource efficiency may be improved.

In order to change the value of an MSP when time-division transmission in which a multiple of the MSP is set as a time-division period is performed, a procedure of changing an MCCH may be required because the change of the MSP has to be indicated by changing an mch-SchedulingPeriod message, which is transferred to the terminal through the MCCH. Because 5120 ms and 10240 ms can be set as the MCCH change period in the 3GPP standard, the MSP value may be changed only at the corresponding time.

Also, when the MSP value can be maintained, the ratio between the 3GPP signal and non-3GPP signal to be transmitted can be changed by changing the number of MSPs during which each of the 3GPP signal and the non-3GPP signal is to be transmitted, so the ratio may be set merely by changing the MSI. When changing the MSP is required, the procedure of changing the MCCH has to be performed.

Figure 14:
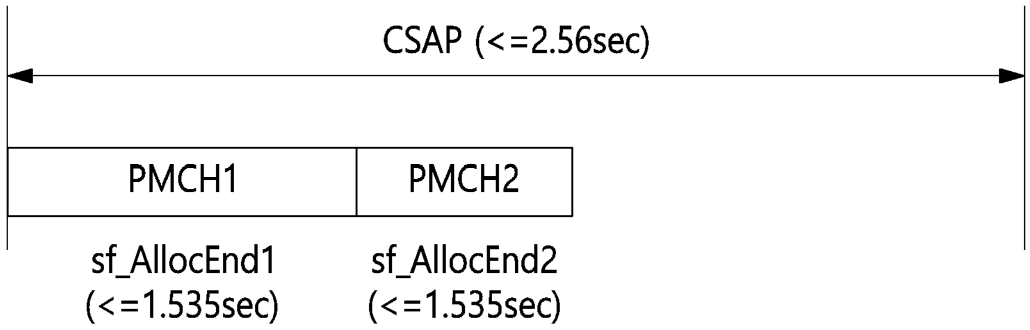
FIG. 14 is a view for explaining a method for indicating time-division information to a terminal using a Common Subframe Allocation Period (CSAP) and Sf-AllocEnd.

FIG. 14 is a view for explaining a method for indicting time-division information to a terminal using a CSAP and Sf-AllocEnd.

As illustrated in FIG. 14, a CSAP may be indicated to a terminal using a form of commonsf-AllocPeriod, which is an RRC message, through an MCCH, which is a logical channel. One of values such as 40 ms, 80 ms, 160 ms, . . . , 2560 ms defined in the 3GPP standard may be set as a time-division period. A section in which a 3GPP signal is transmitted within the time-division period may be indicated to a terminal using a form of Sf-AllocEnd, which is an RRC message, through the MCCH, which is a logical channel.

Sf-AllocEnd is set for each PMCH within a CSAP and indicates a section in which a current PMCH is transmitted based on the time at which transmission of a previous PMCH ends. When one or more PMCHs are transmitted, the sum of Sf-AllocEnd values corresponding to each PMCH may indicate a section in which the 3GPP signal is transmitted in the time-division period.

Sf-AllocEnd may have one of values of 1 ms, 2 ms, 3 ms, 1535 ms defined in the 3GPP standard.

The transmission end may notify the terminal of a time-division period and a section in which a 3GPP signal is transmitted using a CSAP and one or more Sf-AllocEnd values, and the sum of the Sf_allocEnd values may be set equal to or less than the CSAP.

Figure 15:
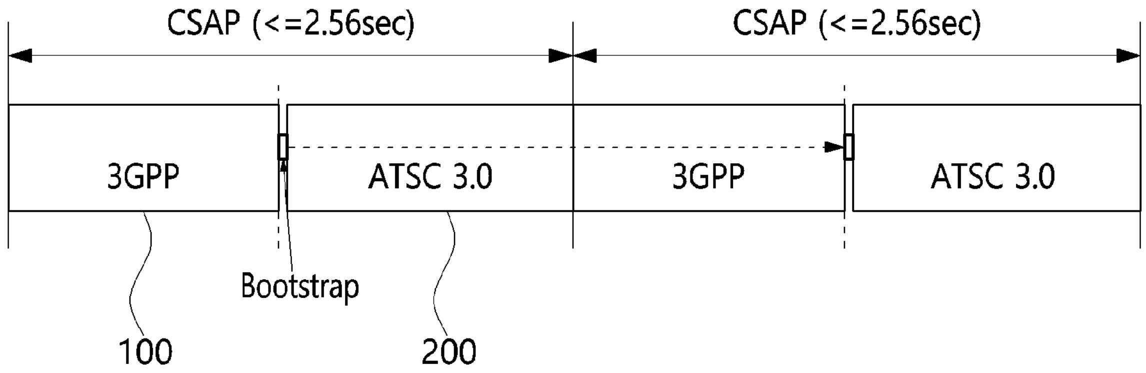
FIG. 15 is a view illustrating a process in which a 3GPP signal and an ATSC 3.0 signal are alternately transmitted within a time-division period when a CSAP is set as the time-division period.
Figure 16:
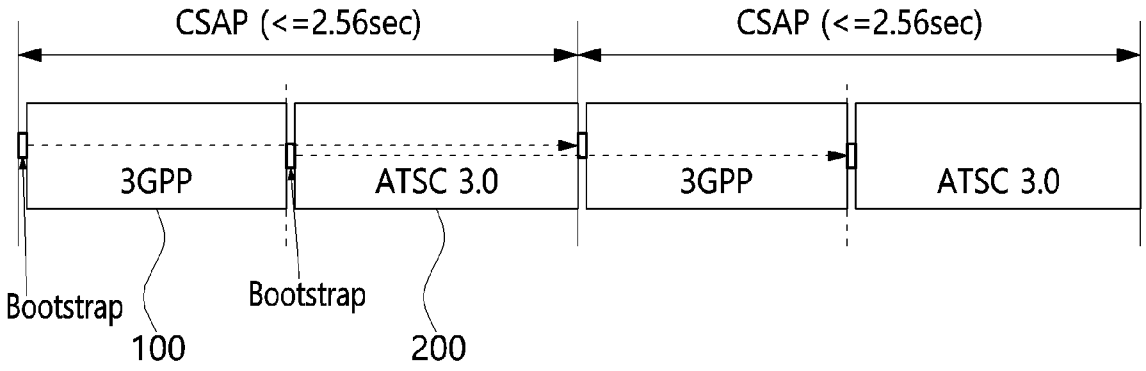
FIG. 16 is a view for explaining a method for transmitting a bootstrap before a non-ATSC 3.0 signal in FIG. 15.

FIG. 15 is a view illustrating a process in which a 3GPP signal and an ATSC 3.0 signal are alternately transmitted in a time-division period when a CSAP is set as the time-division period, and FIG. 16 is a view for explaining a method for transmitting a bootstrap before a non-ATSC 3.0 signal in FIG. 15.

As illustrated in FIG. 15, a 3GPP terminal is made aware of a section in which a 3GPP signal 100 is transmitted through Sf-AllocEnd values, and an ATSC 3.0 terminal is made aware of the time-division period and a section in which an ATSC 3.0 signal 200 is transmitted within the time-division period through a bootstrap and a preamble. As illustrated in FIG. 16, a bootstrap may also be transmitted before the 3GPP signal 100, which is a non-ATSC 3.0 signal.

The apparatus for time-division transmission of heterogeneous physical-layer signals according to an embodiment may be implemented in a computer system including a computer-readable recording medium.

Figure 17:
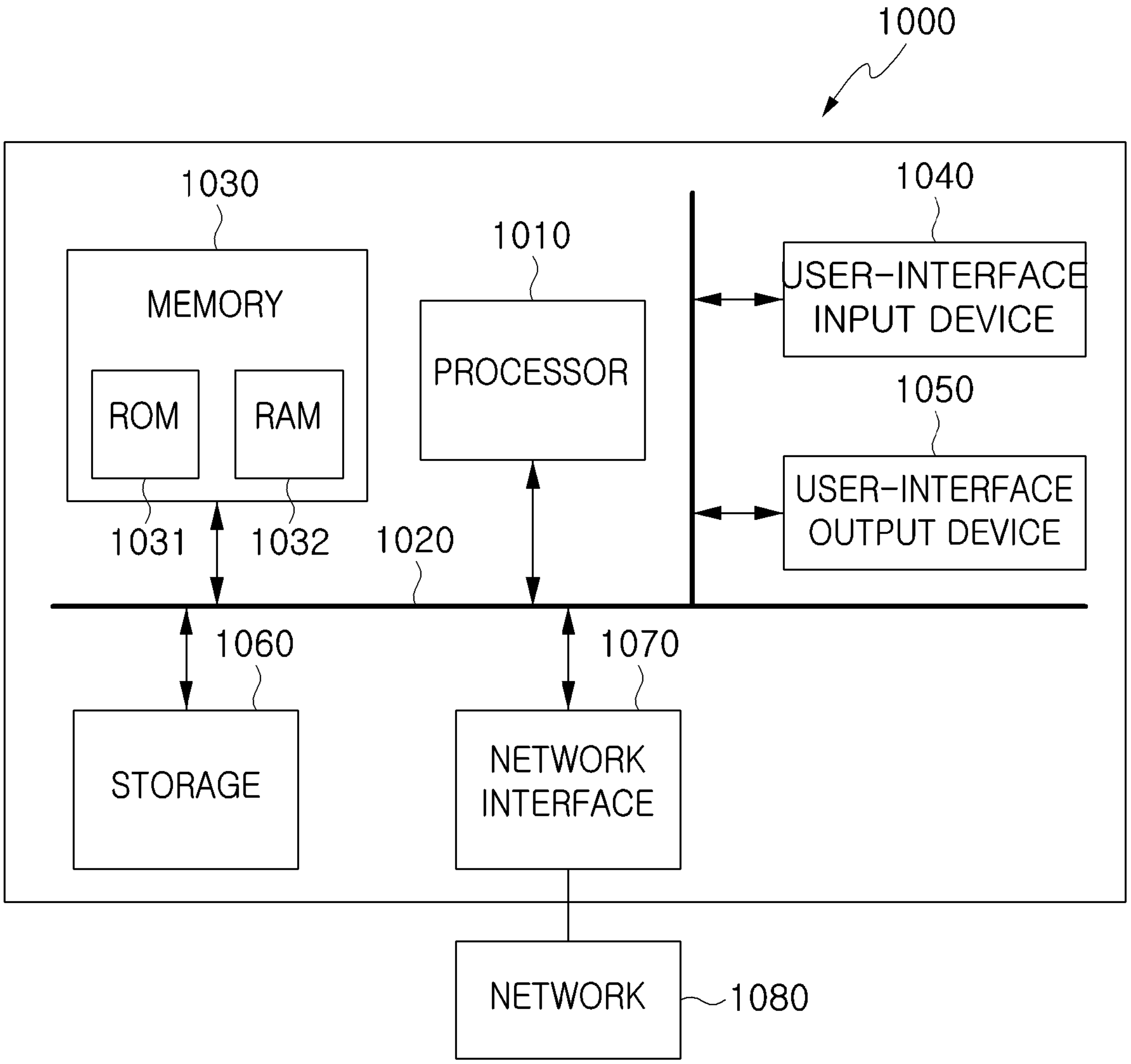
FIG. 17 is a block diagram illustrating the configuration of a computer system according to an embodiment.

FIG. 17 is a block diagram illustrating the configuration of a computer system according to an embodiment.

Referring to FIG. 17, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus for time-division transmission of heterogeneous physical-layer signals.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for time-division transmission of heterogeneous physical-layer signals according to an embodiment. Specifically, the memory may store multiple applications running in the apparatus for time-division transmission of heterogeneous physical-layer signals and data and instructions for operation of the apparatus for time-division transmission of heterogeneous physical-layer signals.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program therein may contain instructions for making a processor perform a method including an operation for setting time-division-related information and an operation for alternately transmitting heterogeneous physical-layer signals to a terminal over the same frequency resource based on the time-division-related information.

According to an embodiment, a computer program stored in the computer-readable recording medium may include instructions for making a processor perform an operation for setting time-division-related information and an operation for alternately transmitting heterogeneous physical-layer signals to a terminal over the same frequency resource based on the time-division-related information.

The present disclosure has the effect of enabling different types of physical-layer signals to be transmitted within a time-division period in a time-division manner.

Also, the present disclosure is configured to transfer information about time-division transmission to a terminal, whereby unnecessary power consumption, which can be caused when the terminal receives signals other than target signals, may be minimized.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for time-division transmission of heterogeneous physical-layer signals, comprising:

setting period information associated with a period and section information associated with a section within the period in which a communication signal is to be transmitted; and transmitting the communication signal based on the set period and the section, wherein setting the period information determines a time range of the period, and setting the section information determines a time range of the section in which the communication signal is transmitted, wherein transmitting the communication signal comprises controlling transmission such that the communication signal is transmitted in the section during the period over the same frequency resource, and is not transmitted in a remaining section so that the remaining section is available for transmission of a signal of other physical layer, wherein the communication signal is based on the 3GPP standard and the signal of other physical layer is based on a non-3GPP broadcasting technology, and wherein the period information is set such that the period aligns with a Multicast Channel (MCH) scheduling period (MSP) to create a blank interval for transmitting the signal of the non-3GPP broadcasting technology.

2. The method of claim 1, wherein the section in which the communication signal is transmitted begins from the start of the period.

3. The method of claim 1, wherein the section information is changed to adjust the transmission ratio of the signal of the other physical layer.

4. The method of claim 1, wherein the time range of the section in which the communication signal is transmitted is set as one of the MCH scheduling information (MSI) values.

5. The method of claim 1, wherein the section information is set to define the end point of the communication signal transmission within the period.

6. The method of claim 1, wherein the time range of the period is set as one of 320 ms, 640 ms, 1280 ms, or 2560 ms.

7. The method of claim 1, wherein control information is transmitted before other communication signals in the section in which the communication signal is transmitted.

8. The method of claim 1, further comprising:

notifying the terminal of the period information and the section information via a radio resource control (RRC) message.

9. The method of claim 1, wherein the signal of the other physical layer is a signal transmitted through other broadcast technology.

10. An apparatus for time-division transmission of heterogeneous physical-layer signals, comprising:

memory in which a control program for time-division transmission of heterogeneous physical-layer signals is stored; and a processor for executing the control program stored in the memory, wherein the processor is configured to:

set period information associated with a period and section information associated with a section within the period in which a communication signal is to be transmitted;

control the communication signal to be transmitted in the section during the period over the same frequency resource and not transmitted in a remaining section so that the remaining section is available for transmission of a signal of other physical layer, wherein setting the period information determines a time range of the period and setting the section information determines a time range of the section in which the communication signal is transmitted, wherein the communication signal is based on the 3GPP standard and the signal of other physical layer is based on a non-3GPP broadcasting technology, and wherein the period information is set such that the period aligns with a Multicast Channel (MCH) scheduling period (MSP) to create a blank interval for transmitting the signal of the non-3GPP broadcasting technology.

11. The apparatus of claim 10, wherein the section in which the communication signal is transmitted starts from the beginning of the period.

12. The apparatus of claim 10, wherein the processor is further configured to change the section information to adjust the transmission ratio of the signal of the other physical layer.

13. The apparatus of claim 10, wherein the time range of the section in which the communication signal is transmitted is determined based on one of the MCH scheduling information (MSI) values.

14. The apparatus of claim 10, wherein the section information is set to define the end point of the communication signal transmission within the period.

15. The apparatus of claim 10, wherein the time range of the period is set as one of 320 ms, 640 ms, 1280 ms, or 2560 ms.

16. The apparatus of claim 10, wherein control information is transmitted before other communication signals in the section in which the communication signal is transmitted.

17. The apparatus of claim 10, wherein the processor is further configured to notify the terminal of the period information and the section information via a radio resource control (RRC) message.

18. The apparatus of claim 10, wherein the signal of the other physical layer is a signal transmitted through other broadcast technology.

* * * * *